United States Patent
Iwasaki et al.

(10) Patent No.: US 11,130,433 B2
(45) Date of Patent: Sep. 28, 2021

(54) FLOOR STRUCTURE

(71) Applicant: HONDA MOTOR CO., LTD., Tokyo (JP)

(72) Inventors: Hiroyuki Iwasaki, Wako (JP); Yoshiaki Okutomi, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 16/578,702

(22) Filed: Sep. 23, 2019

(65) Prior Publication Data

US 2020/0094722 A1  Mar. 26, 2020

(30) Foreign Application Priority Data

Sep. 25, 2018 (JP) .............................. JP2018-178852

(51) Int. Cl.
   *B60N 3/06* (2006.01)

(52) U.S. Cl.
   CPC ..................... *B60N 3/06* (2013.01)

(58) Field of Classification Search
   CPC ................ B60N 3/06; B60T 7/06; G05G 1/60
   USPC ........................................................... 296/75
   See application file for complete search history.

(56) References Cited

U.S. PATENT DOCUMENTS

| | | | | |
|---|---|---|---|---|
| 3,047,088 A | * | 7/1962 | Murrell | G05G 1/60 180/90.6 |
| 3,275,094 A | * | 9/1966 | Kennedy | G05G 1/60 180/90.6 |
| 7,946,641 B2 | * | 5/2011 | Ohtsubo | B60N 2/1615 296/75 |
| 8,444,203 B2 | * | 5/2013 | Ohtsubo | B60N 2/074 296/75 |
| 8,939,496 B2 | * | 1/2015 | Obayashi | B62D 25/08 296/187.08 |
| 2014/0265509 A1 | | 9/2014 | Meszaros et al. | |
| 2017/0240044 A1 | * | 8/2017 | Tabata | B60T 7/06 |

FOREIGN PATENT DOCUMENTS

| | | | | |
|---|---|---|---|---|
| CN | 203727298 U | * | 7/2014 | ............... B60N 3/06 |
| JP | 2001219872 A | * | 8/2001 | |
| JP | 2004-199199 A | | 7/2004 | |
| JP | 2012-046008 A | | 3/2012 | |
| JP | 2014-083961 A | | 5/2014 | |
| JP | 2015003733 A | * | 1/2015 | |

(Continued)

OTHER PUBLICATIONS

Office Action received in corresponding Japanese application No. 2018-178852 dated May 19, 2020 with English translation (11 pages).

*Primary Examiner* — Jason S Morrow
*Assistant Examiner* — Kevin P Weldon
(74) *Attorney, Agent, or Firm* — Rankin, Hill & Clark LLP

(57) ABSTRACT

Provided is a floor structure of a vehicle having a pedal device to be pressed down by a driver seated in a driver seat of the vehicle. The floor structure is arranged relative to the pedal device and includes: a heel stopper part located substantially below the pedal device; and a pedal stopper part located on a vehicle-forward side of the heel stopper part and serving to prevent the pedal device from being excessively pressed down by the driver. The heel stopper part and the pedal stopper part are formed integrally with each other.

7 Claims, 5 Drawing Sheets

(56) References Cited

FOREIGN PATENT DOCUMENTS

| | | |
|---|---|---|
| JP | 2016-172483 A | 9/2016 |
| JP | 6352842 B2 | 7/2018 |
| KR | 101674825 B1 * | 11/2016 |

* cited by examiner

FLOOR STRUCTURE

CROSS-REFERENCE TO RELATED APPLICATIONS

The present application claims priority under 35 U.S.C. § 119 to Japanese Patent Application No. 2018-178852, filed Sep. 25, 2018, the contents of which are hereby incorporated by reference in their entirety.

BACKGROUND OF THE INVENTION

1. Field of the Invention

The present invention relates to a floor structure arranged relative to a brake pedal and an accelerator pedal of a vehicle, which are to be pressed down by a driver seated in a driver seat using his/her foot.

2. Description of the Related Art

Conventionally, a brake pedal and an accelerator pedal, which are to be pressed down by a driver using his/her foot, are arranged at positions in front of and below the driver seat of the vehicle. In general, the floor in front of the driver seat has a footrest part on which the driver places his/her foot operating the brake pedal and a heel stopper part on which the driver places his/her foot operating the accelerator pedal (see, for example, Japanese Patent Publication No. 6352842).

Japanese Patent Publication No. 6352842 discloses a vehicle floor spacer including a base body (30) having a horizontal pad (10) integrally formed with a footrest part (21) and a heel stopper part (22).

SUMMARY OF THE INVENTION

The vehicle floor space disclosed in Japanese Patent Publication suffer from a problem in that when the driver applies an excessive force to the accelerator pedal while operating the accelerator pedal using the heel stopper part (22) as a fulcrum, the accelerator pedal could be pressed down excessively.

An object of the present invention is to provide a floor structure capable of preventing a pedal, such as an accelerator pedal, from being pressed down excessively.

To achieve the above object, an aspect of the present invention is a floor structure of a vehicle having a pedal device to be pressed down by a driver seated in a driver seat of the vehicle.

The floor structure is arranged relative to the pedal device and includes: a heel stopper part located substantially below the pedal device; and a pedal stopper part located on a vehicle-forward side of the heel stopper part and serving to prevent the pedal device from being excessively pressed down by the driver. The heel stopper part and the pedal stopper part are formed integrally with each other.

The present invention provides a floor structure capable of preventing a pedal, such as an accelerator pedal, from being pressed down excessively.

DETAILED DESCRIPTION OF THE EMBODIMENTS

Hereinafter, descriptions will be given of a floor structure 1 according to an embodiment of the present invention with reference to FIGS. 1 to 4.

The embodiment of the present invention will be described by exemplifying a case of a right-hand drive, automatic transmission vehicle equipped with a brake pedal 2 and an accelerator pedal 3.

The descriptions will be provided as appropriate with "front", "rear", "up", "down", "left" and "right" representing a forward direction of, a rearward direction of, a vertically upward direction from, a vertically downward direction from, and width directions of the vehicle.

Floor Structure

Figure 1:
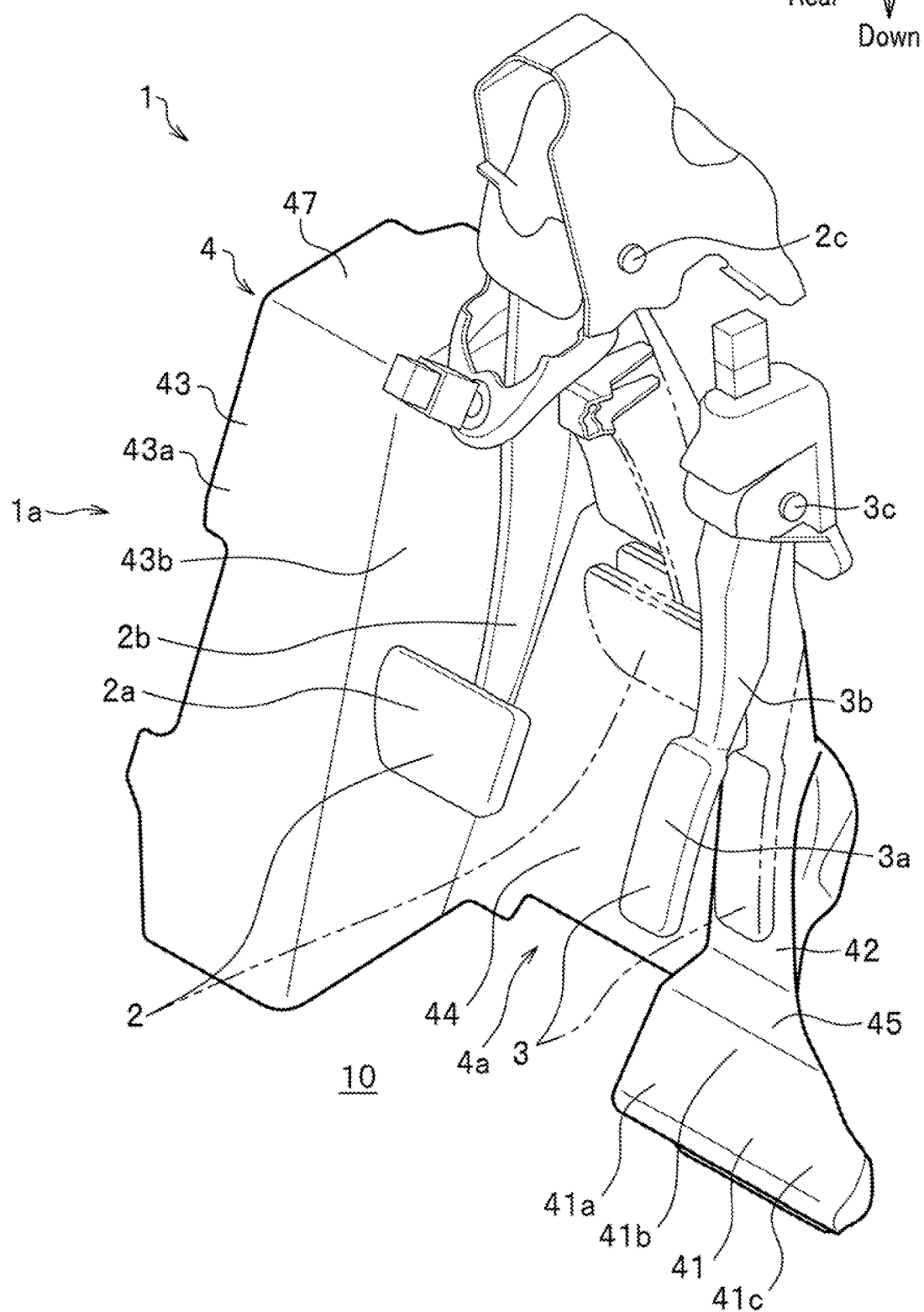
FIG. 1 is a perspective view schematically illustrating principal components of a floor structure according to an embodiment of the present invention.

As shown in FIG. 1, the floor structure 1 of the vehicle includes a brake pedal 2 and an accelerator pedal 3, which allows a driver, seated in a driver seat, to operate the vehicle by pressing down on them. The brake pedal 2 and the accelerator pedal 3 are arranged on the forward side (footrest area 1a) of the driver seat located within a forward section of the passenger compartment. A floor panel 10 and a footrest member 4 disposed on a forward end portion of the floor panel 10 are located in the footrest area 1a.

The footrest member 4 may be integrally formed with the floor panel 10 or may be formed separately from the floor panel 10 and fixed to the floor panel 10. Hereinafter, a case in which the footrest member 4 and the floor panel 10 are formed separately will be described by way of example.

Floor Panel

The floor panel 10 is a thin, plate-like metal member constituting a floor of the passenger compartment. The floor panel 10 includes a horizontal panel portion 11 and a toe board portion 12. The horizontal panel portion 11 extends horizontally. The toe board portion 12 extends forward and obliquely upward from a front-end portion of the horizontal panel portion 11, defining an obtuse angle with the horizontal panel portion 11.

The toe board portion 12 extends substantially upward to connect to a vertical portion of a dashboard 13.

Brake Pedal

The brake pedal 2 is configured for operation by a foot of the driver. The driver presses the brake pedal 2 by his/her foot to brake the vehicle. As shown in FIG. 1, the brake pedal 2 includes a pedal pad 2a and a pedal arm 2b to which the pedal pad 2a is welded and which extends upward from the pedal pad 2a. The driver places on his/her foot on the pedal pad 2a. The brake pedal 2 is configured to be pivoted toward the later-described connection part 44 when pressed by a foot.

The pedal pad 2a is a plate-like member having a length extending in the vehicle width direction (left-right direction) and is a part (pressing point) where the driver puts down his/her hoot. The pedal arm 2b is pivotably supported about a rotational axis 2c extending in the vehicle width direction above the pedal pad 2a.

Accelerator Pedal

The accelerator pedal 3 is configured for operation by a foot of the driver. The driver presses the accelerator pedal 3 by his/her foot to accelerate the vehicle. As shown in FIG. 1, the accelerator pedal 3 include a pedal pad 3a and a pedal arm 3b that extends upward from the pedal pad 3a.

The pedal pad 3a is a plate-like member having an inclined length extending inclined relative to the vehicle front-rear direction and is a part (pressing point) where the driver puts down his/her hoot. The pedal arm 3b is pivotably supported about a rotational axis 3c extending in the vehicle width direction above the pedal pad 3a.

Figure 2:
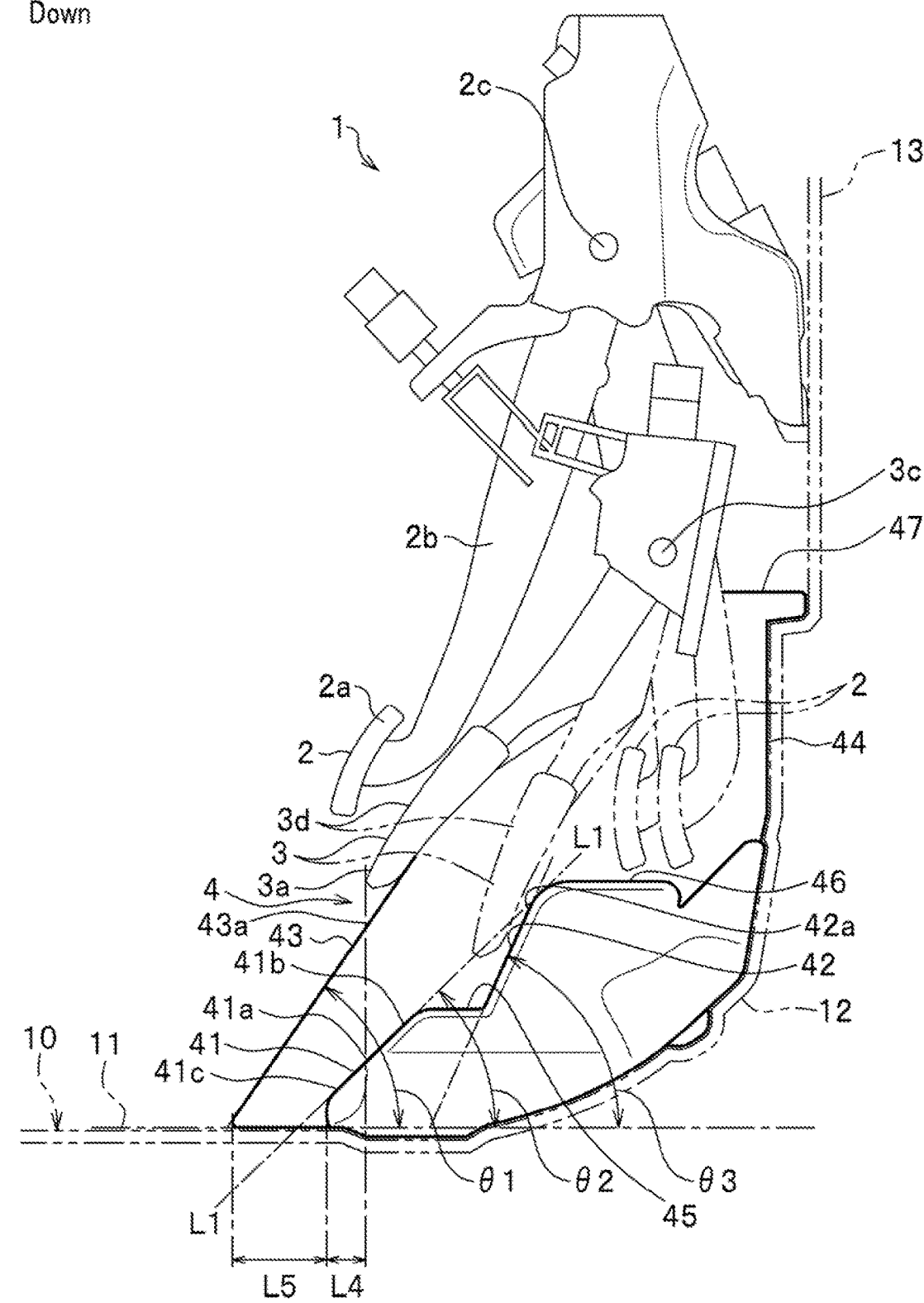
FIG. 2 is a side view schematically illustrating principal components of the floor structure according the embodiment of the present invention.

The brake pedal 2 and the accelerator pedal 3 are mounted in a suspended manner for example, as shown in FIG. 2. However, the brake pedal 2 and the accelerator pedal 3 may be mounted like an organ pedal such that the rotational axes 2c and 3c are located on the floor side. The brake pedal 2 and the accelerator pedal 3 is arranged substantially parallel to the toe board portion 12 in side view.

Footrest Member

The footrest member 4 is a member on which the driver, who operates the brake pedal 2 and the accelerator pedal 3, places his/her foot. The footrest member 4 is a pedestal-like member made of a resin or a metal.

Figure 4:
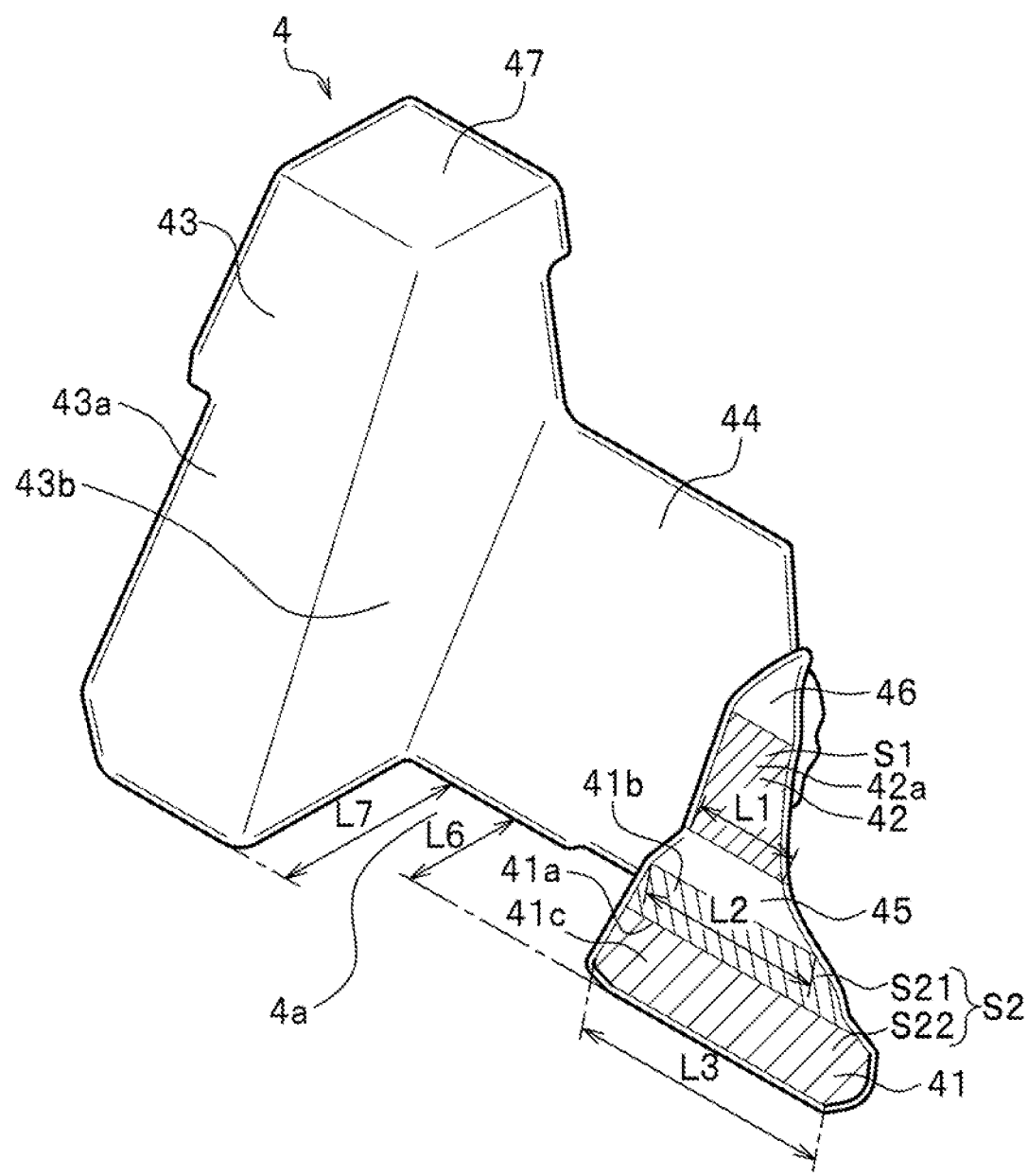
FIG. 4 is a perspective view illustrating a footrest member including a heel stopper part and an accelerator pedal stopper part.

As shown in FIG. 4, the footrest member 4 integrally includes a heel stopper part 41, an accelerator pedal stopper part 42 (pedal stopper part), a footrest part 43, a connection part 44, a stepped portion 45, an accelerator pedal stopper part upper flat portion 46, and a footrest part upper flat portion 47.

Heel Stopper Part

Figure 3:
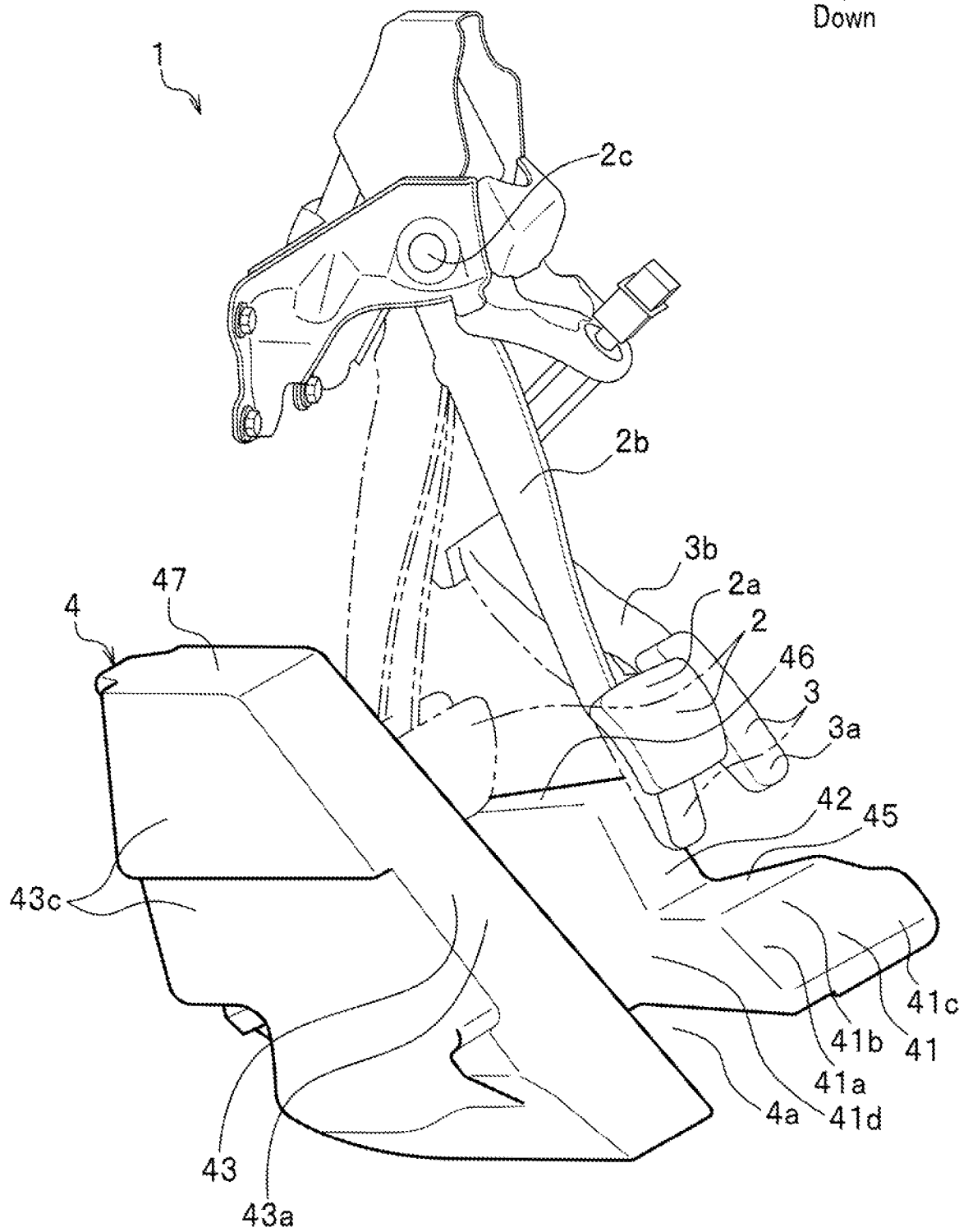
FIG. 3 is a perspective view schematically illustrating principal components of the floor structure according to the embodiment of the present invention.

As shown in FIGS. 1 to 3, the heel stopper part 41 is a portion on which the driver, who operates the accelerator pedal 3, places the heel of his/her foot. The heel stopper part 41 is formed at a right lower end portion of the footrest member 4. The heel stopper part 41 has a sloped surface 41a formed thereon sloped in side view and including an upper portion 41b and a lower portion 41c extending from a rear end of the upper portion 41b toward the floor panel 10 located on the lower side of the heel stopper part 41.

As shown in FIG. 2, the heel stopper part 41 is located substantially below the pedal pad 3a of the accelerator pedal 3. The heel stopper part 41 has a rear lower end portion located rearward relative to a lower end portion of the pedal pad 3a of the accelerator pedal 3 by a length L4. The rear lower end portion of the heel stopper part 41 is located forward relative to a rear lower end portion of the footrest part 43 by a length L5.

The accelerator pedal stopper part 42 has a sloped surface 42a formed thereon. As shown in FIG. 4, the area S2 of the sloped surface 41a of the heel stopper part 41 is larger than the area S1 of the sloped surface 42a of the accelerator pedal stopper part 42. The upper-side lateral width L2 and the lower-side lateral width L3 of the sloped surface 41a of the heel stopper part 41 are larger than the lateral width L1 of the accelerator pedal stopper part 42.

The area S21 of the upper portion 41b of the sloped surface 41a of the heel stopper part 41 is smaller than the area S22 of the lower portion 41c of the sloped surface 41a of the heel stopper part 41. The vehicle width direction length L2 of the upper portion 41b (upper-side lateral width L2 of the sloped surface 41a) is smaller than the vehicle width direction length L3 of the lower portion 41c (lower-side lateral width L3 of the sloped surface 41a). In other words, in front view, the sloped surface 41a of the heel stopper part 41 has a substantially trapezoid shape with a top width (L2) and a bottom width (L3) larger than the top width, i.e., L2 is smaller than L3.

This structure allows the driver to easily move his/her right foot between the accelerator pedal 3 and the brake pedal 2 in a stable manner because, when the driver attempts to move his/her right foot between the accelerator pedal 3 and the brake pedal 2, this structure allows the driver to place the heel of his/her right foot on the heel stopper part 41 in a stable manner and direct the toe of the right foot to the brake pedal pad 2a or to the accelerator pedal pad 3a in a good manner. The stepped portion 45 is formed between the heel stopper part 41 and the accelerator pedal stopper part 42 and is substantially horizontal.

The stepped portion 45 is located substantially below and slightly forwardly of the pedal pad 3a of the accelerator pedal 3 in side view. The stepped portion 45 has a substantially trapezoid shape in plan view, tapering from a wider rear width (L2) to a narrower front width (L1).

As shown in FIG. 2, the sloped surface 41a of the heel stopper part 41 is formed such that, as seen from a side of the vehicle, an imaginary line L1-L1 drawn tangent to the sloped surface 41a is substantially tangent to the accelerator pedal stopper part 42. The sloped surface 41a defines an angle θ2 of, for example, 45.8 degrees with the horizontal panel portion 11 of the floor panel 10.

Accelerator Pedal Stopper Part 42

The accelerator pedal stopper part 42 is a portion that abuts against the pedal pad 3a when the driver presses down the accelerator pedal 3 by an amount further than a predetermined amount of pressing, to restrain the accelerator pedal 3 from pivoting further. The accelerator pedal stopper part 42 of the footrest member 4 is located on a vehicle-forward side of the heel stopper part 41, which is located substantially below the accelerator pedal 3. The accelerator pedal stopper part 42 is located substantially below and forwardly of the pedal pad 3a of the accelerator pedal 3 in rear view. The lower end portion of the accelerator pedal 3 is located on a vehicle-forward side relative to the rear end portion of the heel stopper part 41. The accelerator pedal stopper part 42 has a substantially trapezoid shape in front view, tapering from a wider bottom width (L1) to a narrower top width. The sloped surface 42a of the accelerator pedal stopper part 42 defines an angle θ3 of, for example, 65.6 degrees with the horizontal panel portion 11 of the floor panel 10. The accelerator pedal stopper part upper flat portion 46 is formed extending from an upper end of the sloped surface 42a of the accelerator pedal stopper part 42.

The accelerator pedal stopper part upper flat portion 46 is located forwardly of the pedal pad 3a of the accelerator pedal 3 in side view. The accelerator pedal stopper part upper flat portion 46 has a substantially right-triangle shape in plan view.

Footrest Part

As shown in FIG. 1, the footrest part 43 is a place on which the driver seated in the driver seat places his/her left foot. Referring to FIGS. 1 and 3, the footrest part 43 includes a sloped surface 43a formed on the rear side, a footrest part inner wall 43b formed on the right side and extending from a right edge of the sloped surface 43a, a footrest part outer wall 43c formed on the left side and extending from a left edge of the sloped surface 43a, and a footrest part upper flat portion 47 formed on the upper side and extending from an upper edge of the sloped surface 43a.

The footrest part 43 is formed on the left end of the footrest member 4. The footrest part 43 is located on the left side of the brake pedal 2 in rear view. The sloped surface 43a of the footrest part 43 is upwardly and forwardly inclined from a rear lower end of the footrest part 43. With this structure, while driving the vehicle, the driver can favorably place the heel of his/her left foot on the sloped surface 43a of the footrest part 43 in such a way that the heel is face-to-face contact with the sloped surface 43a.

As shown in FIG. 2, the lower end of the footrest part 43 is located at substantially the same height as the lower end of the heel stopper part 41. The sloped surface 43a has substantially the same inclination angle as the sloped surface 41a of the heel stopper part 41. Formed on the upper end of the footrest part 43 is the footrest part upper flat portion 47. The footrest part upper flat portion 47 is substantially horizontal and is located at a higher position than the accelerator pedal stopper part upper flat portion 46.

Connection Part

As shown in FIG. 4, the connection part 44 connects between the footrest part 43 and the heel stopper part 41. The connection part 44 is located forwardly relative to the rear lower end portion of the heel stopper part 41 and is apart therefrom by a distance L6 in the vehicle forward direction.

The connection part 44 is located forwardly relative to the rear lower end portion of the footrest part 43 and is apart therefrom by a distance L7 in the vehicle forward direction.

The connection part 44 is made of a plate-shaped member arranged substantially parallel to the sloped surface 43a of the footrest part 43. Thus, the connection part 44 has substantially the same inclination angle as the sloped surface 43a. The connection part 44 defines, together with the footrest part 43 and the heel stopper part 41, a recess 4a having a recessed shape in plan view on the rear side of the connection part 44. The pedal pad 2a of the brake pedal 2 is located in the recess 4a. In other words, the connection part 44 is located at a position such the brake pedal 2 is pivoted toward the position when the brake pedal 2 is pressed down, as shown in FIGS. 1 and 2.

The recess 4a provides a concavity in which the brake pedal 2 is pivotably arranged as shown in FIG. 2.

As shown in FIGS. 1 and 3, the recess 4a is defined by the connection part 44, the footrest part inner wall 43b extending rearward from a left end portion of the connection part 44, and a heel stopper part inner wall 41d extending rearward from a right end portion of the connection part 44.

Operation of Floor Structure

Next, with reference to FIGS. 1 to 4, and with reference mainly to FIG. 4, operations of the floor structure 1 according to the embodiment of the present invention will be described.

When the driver drives the vehicle, the diver places his/her left foot on the sloped surface 43a of the footrest part 43, places the heel of his/her right foot on the heel stopper part 41, and presses down the accelerator pedal 3. When the driver presses down the accelerator pedal 3 by an amount greater than a predetermined amount of pressing, the pedal pad 3a of the accelerator pedal 3 abuts against the sloped surface 42a of the accelerator pedal stopper part 42, thereby restraining the accelerator pedal 3 from being pressed down excessively.

When the driver applies a brake, the driver places the heel of his/her right foot on the sloped surface 41a of the heel stopper part 41 and presses down the brake pedal 2 by the right foot.

As described, the floor structure 1 according to an embodiment of the present invention is for a vehicle including a brake pedal 2 and an accelerator pedal 3 which are to be pressed down by a driver seated in a driver seat of the vehicle to operate the vehicle. The floor structure 1 is arranged relative to the brake pedal 2 and the accelerator pedal 3 and includes: the heel stopper part 41, which is located substantially below the accelerator pedal 3; and the accelerator pedal stopper part 42 (pedal stopper part), which is located on a vehicle-forward side of the heel stopper part 41, wherein the heel stopper part 41 and the accelerator pedal stopper part 42 are formed integrally with each other.

According to the floor structure 1 of the embodiment of the present invention, the accelerator pedal stopper part 42 (pedal stopper part) is located on the vehicle-forward side of the heel stopper part 41, which is located substantially below the accelerator pedal 3. With this structure, even when the driver attempts to excessively press down the accelerator pedal 3, the accelerator pedal 3 abuts against the accelerator pedal stopper part 42 (pedal stopper part). As a result, the accelerator pedal 3 is prevented from being pressed down excessively.

Moreover, the heel stopper part 41 and the accelerator pedal stopper part 42 (pedal stopper part) are formed integrally with each other. With this structure, even when the driver presses down the accelerator pedal 3 while placing his/her foot on the heel stopper part 41, the foot would not be disengaged from the heel stopper part when the accelerator pedal 3 comes into abutment with the accelerator pedal stopper part 42 (pedal stopper part).

As shown in FIG. 1, the connection part 44 connecting between the footrest part 43 and the heel stopper part 41 is preferably located on the vehicle-forward side of the footrest part 43 and the heel stopper part 41.

With this structure, the connection part 44 does not extend over the floor surface where the feet of the driver are placed and thus does not narrow the floor space. Moreover, the integrally formed footrest member 4 can be installed even in a vehicle with narrow floor space.

The connection part 44 is preferably located at a position such that the brake pedal 2 is pivoted toward the position when pressed down, as shown in FIGS. 1 and 2.

With this structure, as the connection part 44 is located on the vehicle-forward side relative to the footrest part 43 and the heel stopper part 41, the connection part 44 does not obstruct the press operation on the brake pedal 2.

The lower end portion of the accelerator pedal 3 is preferably located on a vehicle-forward side relative to the heel stopper part 41 as shown in FIG. 2.

With this configuration, when the driver, while placing his/her foot on the heel stopper part 41, moves the his/her foot from a pedal which the driver has been operating to another pedal to operate it, the foot of the driver is not likely to come into contact with the accelerator pedal 3. Thus, the configuration allows the driver to operate the pedals smoothly even after his/her foot leaves from the heel stopper part 41.

As shown in FIG. 4, the area S2 of the sloped surface 41a formed on the heel stopper part 41 is preferably larger than the area S1 of the sloped surface 42a formed on the accelerator pedal stopper part 42 (pedal stopper part), and the area S21 of the upper portion 41b of the sloped surface 41a is smaller than the area S22 of the lower portion 41c of the sloped surface 41a.

With this structure, the footrest member 4 allows the driver to easily place his/her foot on the heel stopper part 41 while preventing the driver from placing his/her foot on the accelerator pedal stopper part 42 (pedal stopper part) by eliminating an area for placing the foot. Accordingly, the footrest member 4 prevents the foot of the driver from being caught on the back side of a pedal.

As shown in FIG. 2, the lower end of the footrest part 43 is located at substantially the same height as the lower end of the heel stopper part 41, and the sloped surface 43a formed on the footrest part 43 has substantially the same inclination angle as the sloped surface 41a formed on the heel stopper part 41.

This structure eliminates uncomfortable feeling when the driver places his/her feet on the footrest part 43 and on the heel stopper part 41 at the same time, and increases design quality.

As shown in FIG. 2, the sloped surface 41a of the heel stopper part 41 is formed such that, as seen from a side of the vehicle, an imaginary line L1-L1 drawn tangent to the sloped surface 41a is tangent to the accelerator pedal stopper part 42 (pedal stopper part).

This configuration allows the driver to, while placing his/her foot on the heel stopper part 41, press down the accelerator pedal 3 to the accelerator pedal stopper part 42 (pedal stopper part).

Modification

It should be noted that the present invention is not limited to the foregoing embodiment. It is a matter of course that: the present invention can be variously modified and changed within the scope of the technical ideas; and the present invention covers inventions obtained through these modifications and changes.

Figure 5:
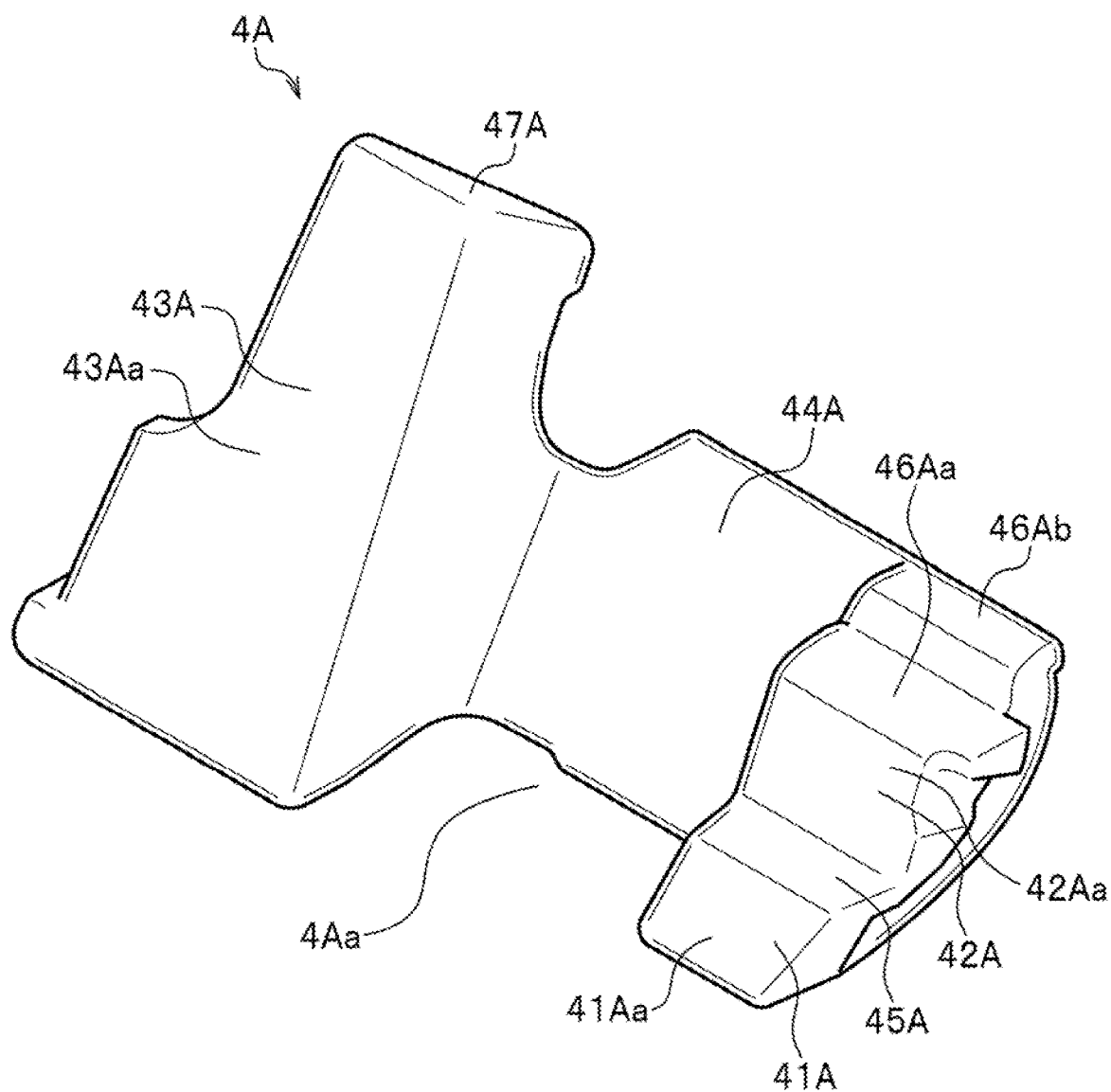
FIG. 5 is a perspective view illustrating a footrest member of a modification of the floor structure according to the embodiment of the present invention.

FIG. 5 is a perspective view of a footrest member according to a modification of the floor structure according to the embodiment of the present application.

The footrest member 4, which has been described by way of example, is one for a right-hand drive vehicle. One for a left handle drive vehicle can be constructed like the footrest member 4A shown in FIG. 5.

The footrest member 4A integrally includes a heel stopper part 41A, an accelerator pedal stopper part 42A, a footrest part 43A, a connection part 44A, a stepped portion 45A, an accelerator pedal stopper part upper flat portions 46Aa and 46Ab, and a footrest part upper flat portion 47A.

The footrest member 4A is similar to the footrest member 4 of the above-described embodiment in that the footrest member 4 includes the heel stopper part 41A, the accelerator pedal stopper part 42A, the footrest part 43A, the connection part 44A, the stepped portion 45A, and the footrest part upper flat portion 47A. The footrest member 4A differs from the footrest member 4 of the above-described embodiment in that the footrest member 4 of the above-described embodiment includes the one accelerator pedal stopper part upper flat portion 46 whereas the footrest member 4A of the modification includes the two of the accelerator pedal stopper part upper flat portions 46Aa and 46Ab.

Moreover, the footrest member 4A of the modification differs from the footrest member 4 of the above-described embodiment in that the heel stopper part 41A, the accelerator pedal stopper part 42A, the stepped portion 45A, the accelerator pedal stopper part upper flat portions 46Aa and 46Ab each has substantially the same lateral width.

Other Modifications

The floor structure 1 according to the embodiment has been described by way of example as having the brake pedal 2 and the accelerator pedal 3, which are arranged at positions in front of and below the driver seat of the vehicle to be operated by the right foot of the driver. But the present invention is not limited thereto. For example, the floor structure 1 may include a parking brake pedal to be operated by the left foot of the driver.

Moreover, the structure of the footrest member 4 of the floor structure 1 according to the embodiment of the present invention and the structure of the footrest member 4A of the floor structure 1 according to the modification can be applied to a manual vehicle provided with a clutch pedal in addition to the brake pedal 2 and the accelerator pedal 3. In this case, the recess 4a is modified to increase the lateral width thereof so that a clutch pedal can be arranged on the left side of the brake pedal 2.

The accelerator pedal stopper part 42 of the embodiment has been described by way of example as being formed on the footrest member 4 as an example of pedal stopper part. However, the present invention is not limited thereto. For example, a pedal to be operated by the driver, such as the brake pedal 2 or the clutch pedal (not shown), may be provided with a pedal stopper part located below the pedal. Such a pedal stopper part can prevent the pedal, i.e., the brake pedal 2 or the clutch pedal (not shown), from being excessively pressed down.

The accelerator pedal stopper part 42 is the most preferable pedal stopper part to be provided.

The accelerator pedal 3 is highly likely to be used (pressed down) by the driver for a long period of time while driving the vehicle. The accelerator pedal stopper part 42 arranged relative to the accelerator pedal 3 serves to provide a press position of the foot pressing down the accelerator pedal 3. As a result, the burden of the driver is greatly decreased.

What is claimed is:

1. A floor structure of a vehicle comprising a pedal device to be pressed down by a driver seated in a driver seat of the vehicle, the floor structure arranged relative to the pedal device and comprising:

a heel stopper part located substantially below the pedal device;

a pedal stopper part located on a vehicle-forward side of the heel stopper part and serving to prevent the pedal device from being excessively pressed down by the driver;

a footrest part located offset from the heel stopper part in a vehicle width direction;

a connection part that connects between the footrest part and the heel stopper part in the vehicle width direction; and a floor panel having a forward end portion with respect to the vehicle, the connection part being disposed on the forward end portion of the floor panel, wherein the heel stopper part and the pedal stopper part are formed integrally with each other, and wherein the connection part is located on a vehicle-forward side relative to the footrest part, the heel stopper part, and the pedal device.

2. The floor structure of claim 1, wherein the pedal device comprises an accelerator pedal to be pressed down by the driver and the heel stopper part is located substantially below the accelerator pedal, and wherein the pedal stopper part is an accelerator pedal stopper part that prevents the accelerator pedal from being excessively pressed down by the driver.

3. The floor structure of claim 1, wherein the pedal device further comprises a brake pedal to be pressed down by the driver, wherein the connection part is located at a position such that the brake pedal is pivoted toward the position when pressed down by the driver.

4. The floor structure of claim 2, wherein the accelerator pedal has a lower end located on a vehicle-forward side relative to the heel stopper part.

5. The floor structure of claim 1, wherein the heel stopper part has a first sloped surface formed thereon and having a first area and the pedal stopper part has a second sloped surface formed thereon and having a second area smaller than the first area, and wherein the first sloped surface has a substantially trapezoid shape with a bottom width and a top width narrower than the bottom width.

6. The floor structure of claim 1, wherein the footrest part has a lower end located at substantially the same height as a lower end of the heel stopper part and has a first sloped surface formed thereon, wherein the heel stopper part has a second sloped surface formed thereon, and wherein the first sloped surface and the second sloped surface have substantially the same inclination angle.

7. The floor structure of claim 1, wherein the heel stopper part has a sloped surface formed thereon such that, as seen from a side of the vehicle, an imaginary line drawn tangent to the sloped surface is substantially tangent to the pedal stopper part.

\* \* \* \* \*